(12) United States Patent
Fukui et al.

(10) Patent No.: US 10,651,506 B2
(45) Date of Patent: May 12, 2020

(54) ALL-SOLID-STATE SECONDARY BATTERY AND METHOD OF PRODUCING THE SAME

(71) Applicant: HITACHI ZOSEN CORPORATION, Osaka-shi, Osaka (JP)

(72) Inventors: Hideyuki Fukui, Osaka (JP); Shiken Ryou, Osaka (JP); Yasushi Takano, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 191 days.

(21) Appl. No.: 15/738,358

(22) PCT Filed: Apr. 27, 2016

(86) PCT No.: PCT/JP2016/063132
§ 371 (c)(1),
(2) Date: Dec. 20, 2017

(87) PCT Pub. No.: WO2016/208271
PCT Pub. Date: Dec. 29, 2016

(65) Prior Publication Data
US 2018/0198169 A1 Jul. 12, 2018

(30) Foreign Application Priority Data

Jun. 23, 2015 (JP) .................. 2015-125202

(51) Int. Cl.
*H01M 10/0585* (2010.01)
*H01M 10/0562* (2010.01)
(Continued)

(52) U.S. Cl.
CPC ......... *H01M 10/0585* (2013.01); *H01M 4/64* (2013.01); *H01M 10/02* (2013.01);
(Continued)

(58) Field of Classification Search
CPC ......... H01M 10/0436; H01M 10/0562; H01M 10/0565; H01M 10/0585; H01M 4/64;
(Continued)

(56) References Cited

U.S. PATENT DOCUMENTS

| 5,547,780 | A | * | 8/1996 | Kagawa | H01M 2/1061 |
| | | | | | 429/127 |
| 2012/0115018 | A1 | * | 5/2012 | Kawaoka | H01M 10/0436 |
| | | | | | 429/162 |
| 2013/0344357 | A1 | | 12/2013 | Miyake | |

FOREIGN PATENT DOCUMENTS

| JP | 04051455 A | * | 2/1992 |
| JP | 05047360 A | * | 2/1993 |

(Continued)

OTHER PUBLICATIONS

EPO www.espacenet.com machine translation of the detailed description of JP-04051455-A. (Year: 1992).*

(Continued)

*Primary Examiner* — Gregg Cantelmo
(74) *Attorney, Agent, or Firm* — Pillsbury Winthrop Shaw Pittman, LLP

(57) ABSTRACT

The present invention provides an all-solid-state secondary battery and a method for producing the same that can prevent the collapse of a laminate due to a shearing force occurring in the peripheral portion of the laminate when the laminate is pressed, and the occurrence of an internal short circuit can be prevented. The all-solid-state secondary battery includes a laminate and a plate-shaped insulating member both arranged between the positive electrode collector and the negative electrode collector. The laminate includes a positive electrode layer, a solid electrolyte layer, and a negative electrode layer. The plate-shaped insulating member is arranged around the laminate and contacted at least with the solid electrolyte layer to electrically insulate the (Continued)

positive electrode layer from the negative electrode layer. In the insulating member, a contact inner edge portion contacted with the laminate is thicker than a plate-shaped portion on the outer side.

1 Claim, 10 Drawing Sheets

(51) Int. Cl.
*H01M 10/0565* (2010.01)
*H01M 10/04* (2006.01)
*H01M 10/02* (2006.01)
*H01M 4/64* (2006.01)
*H01M 4/02* (2006.01)

(52) U.S. Cl.
CPC ... *H01M 10/0436* (2013.01); *H01M 10/0486* (2013.01); *H01M 10/0562* (2013.01); *H01M 10/0565* (2013.01); *H01M 2004/027* (2013.01); *H01M 2004/028* (2013.01); *H01M 2300/0065* (2013.01)

(58) Field of Classification Search
CPC ........... H01M 2004/027; H01M 10/02; H01M 10/0486; H01M 2004/028; H01M 2300/0065
See application file for complete search history.

(56) References Cited

FOREIGN PATENT DOCUMENTS

| | | |
|---|---|---|
| JP | 2007-005279 A | 1/2007 |
| JP | 2010-282803 A | 12/2010 |
| JP | 2013-157334 A | 8/2013 |
| JP | 2013-182842 A | 9/2013 |
| JP | 2014-102982 A | 6/2014 |
| JP | 2014-222564 A | 11/2014 |
| JP | 2016-091750 A | 5/2016 |
| WO | 2012/124108 A1 | 9/2012 |

OTHER PUBLICATIONS

International Search Report PCT/JP2016/063132 dated Aug. 2, 2016 with English translation.
Extended European Search Report EP Application No. 16814042.4 dated Mar. 16, 2018.
Decision to Grant a Patent dated Sep. 17, 2019 issued in corresponding Japanese Patent Application No. 2015-125202 with English translation.
First Office Action Chinese Patent Application No. 201680035240.2 dated Aug. 5, 2019 with English translation.

* cited by examiner

ALL-SOLID-STATE SECONDARY BATTERY AND METHOD OF PRODUCING THE SAME

CROSS-REFERENCE TO RELATED APPLICATIONS

This application is the U.S. National Stage of PCT/JP2016/063132, filed Apr. 27, 2016, which in turn claims priority to Japanese Patent Application No. JP 2015-125202, filed Jun. 23, 2015. The contents of each these applications are incorporated herein by reference in their entireties.

TECHNICAL FIELD

The present invention relates to an all-solid-state secondary battery and a method of producing the same.

BACKGROUND

Typically, an all-solid-state secondary battery includes a positive electrode layer, a negative electrode layer, and a solid electrolyte layer interposed between the positive electrode layer and the negative electrode layer, and also includes collectors arranged on outer surfaces of these electrode layers. In a method of producing such an all-solid-state secondary battery, a charged powder material is sprayed onto a substrate along with a carrier gas and is deposited by an electrostatic force to form a film. Each constituent layer of the battery is formed in this manner. Then, a laminate composed of these constituent layers is pressed (pressurized) to produce a battery (see, for example, Patent Literature 1).

This method makes it possible to form constituent layers of a powder material to a uniform thickness, and therefore, a pressing force applied for pressure molding is transmitted uniformly through the entire laminate, resulting in high performance of the all-solid-state secondary battery.

RELEVANT REFERENCES

List of Relevant Patent Literatures

Patent Literature 1: Japanese Patent Application Publication No. 2010-282803

SUMMARY

Even in an all-solid-state secondary battery produced by the above production method, an internal short circuit occurs.

As a result of investigation of the cause of the internal short circuit, the cause was identified to be a principal stress and a shearing stress. The principal stress is produced by the force applied for pressing and acts on the constituent layers (hereinafter referred to as the powder layers) made of a powder material, and the shearing stress is produced by the principal stress. That is, when a force is vertically applied to the powder layers, a maximum principal stress is produced in the vertical direction, and a minimum principal stress is produced in the lateral direction. These principal stresses produce the shearing stress in an oblique direction. In other words, the shearing force acts.

The powder layers are stacked to a predetermined thickness. The middle portion of the powder layers is compressed by pressing, but the peripheral portion thereof forms an inclined surface and is thin. Therefore, due to the shearing force, the peripheral portion of the powder layers collapses, leading to the internal short circuit.

One object of the present invention is to provide an all-solid-state secondary battery in which an internal short circuit produced by pressing can be suppressed and a method of producing the same.

To achieve the above object, an all-solid-state secondary battery according to the firsts aspect comprises: a pair of collectors; a laminate; and a plate-shaped insulating member, the laminate and the insulating member being arranged between the pair of collectors, the laminate including a positive electrode layer, a solid electrolyte layer, and a negative electrode layer stacked together, the insulating member being arranged around the laminate and contacted at least with the solid electrolyte layer to electrically insulate the positive electrode layer and the negative electrode layer from each other, wherein in the insulating member, a contact inner edge portion contacted with the laminate has a larger thickness than a plate-shaped portion on an outer side.

The all-solid-state secondary battery according to the second aspect is the all-solid-state secondary battery according to the first aspect wherein the insulating member is arranged between the pair of collectors via a positive electrode-side adhesive layer and a negative electrode-side adhesive layer, and each adhesive layer is arranged distant from an inner end of the insulating member so as to provide a distortion absorbing region to each of the collectors.

Further, a method according to the third aspect is a method of producing an all-solid-state secondary battery, the all-solid-state secondary battery including: a pair of collectors; a laminate; and a plate-shaped insulating member, the laminate and the insulating member being arranged between the pair of collectors, the laminate including a positive electrode layer, a solid electrolyte layer, and a negative electrode layer stacked together, the insulating member being arranged around the laminate and contacted at least with the solid electrolyte layer to electrically insulate the positive electrode layer and the negative electrode layer from each other, the method comprising the steps of: adhering, to a surface of one of the pair of collectors, the plate-shaped insulating member including an opening portion capable of guiding the positive electrode layer or the negative electrode layer and including an inner edge portion of the opening portion having a larger thickness than an outer side thereof; arranging the positive electrode layer or the negative electrode layer in the opening portion of the insulating member adhered in the previous step; arranging the solid electrolyte layer on a top surface of the positive electrode layer or the negative electrode layer arranged in the previous step; arranging the negative electrode layer or the positive electrode layer on a top surface of the solid electrolyte layer arranged in the previous step, and obtaining a laminate; and arranging the other of the pair of collectors on the laminate obtained in the previous step and then applying a pressure.

ADVANTAGES

According to the all-solid-state secondary battery and the method of producing the same of the present invention, the contact inner edge portion of the insulating member contacted with the laminate including electrode layers has a larger thickness than the plate-shaped portion positioned on the outer side. Therefore, it is possible to prevent the collapse of the laminate due to a shearing force occurring in the peripheral portion of the laminate when the laminate is pressed, and therefore it is possible to prevent the occurrence of an internal short circuit.

DESCRIPTION OF THE PREFERRED EMBODIMENTS

An all-solid-state secondary battery and a method of producing the same according to an embodiment of the present invention will be described below in accordance with the accompanying drawings.

First, the configuration of the all-solid-state secondary battery will be described.

Figure 1:
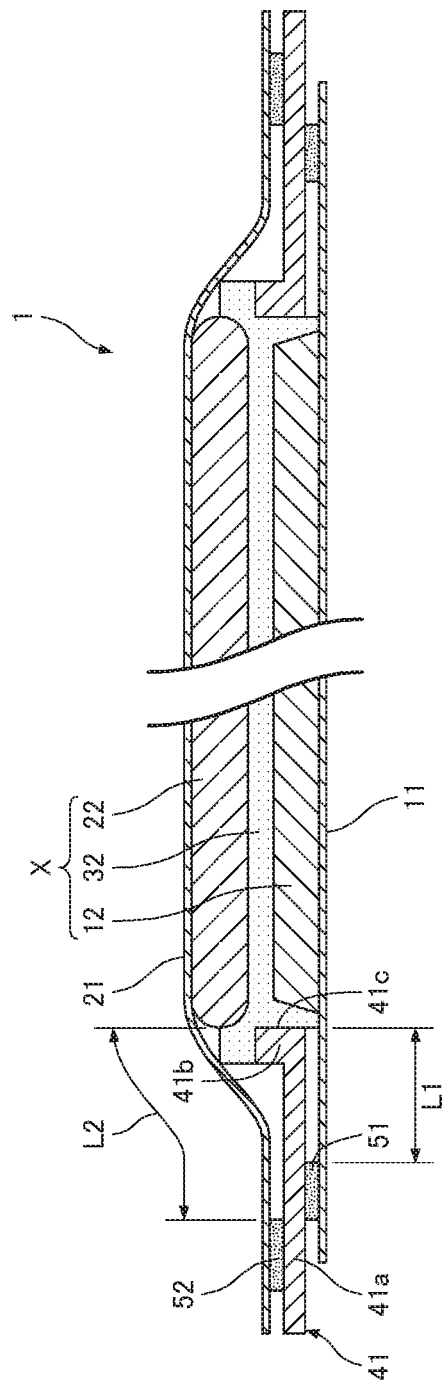
FIG. 1 is a sectional view of an all-solid-state secondary battery according to an embodiment of the present invention.

As shown in FIG. 1, the all-solid-state secondary battery 1 includes a laminate X and a plate-shaped insulating member 41 both arranged between a pair of collectors. The pair of collectors are constituted by a positive electrode collector 11 and a negative electrode collector 21. The laminate X includes a positive electrode layer 12, a solid electrolyte layer 32, and a negative electrode layer 22 stacked in this order. The plate-shaped insulating member 41 is arranged around the laminate X and contacted at least with the solid electrolyte layer 32 to electrically insulate the positive electrode layer 12 and the negative electrode layer 22 from each other. In the insulating member 41, a contact inner edge portion 41b contacted with the laminate X has a larger thickness than a plate-shaped portion 41a positioned on the outer side. Further, the insulating member 41 is adhered to the positive electrode collector 11 and the negative electrode collector 21 via a lower adhesive layer 51 and an upper adhesive layer 52.

The lower adhesive layer 51 and the upper adhesive layer 52 are positioned at predetermined distances (L1, L2) from an end surface of the contact inner edge portion 41b of the insulating member 41 respectively. That is, the portion of the positive electrode collector 11 corresponding to the predetermined length L1 is an unconstrained portion that is not constrained by other members, and the portion of the negative electrode collector 21 corresponding to the predetermined length L2 is an unconstrained portion that is not constrained by other members. These unconstrained portions can be deformed freely. In other words, these unconstrained portions can absorb the distortion produced when an external force acts on the collectors 11, 21. That is, these unconstrained portions can be called distortion absorbing regions.

The insulating member 41 is constituted by an insulating sheet made of a polymer material such as a PET film. The adhesive layers 51, 52 are constituted by pressure sensitive adhesives such as double-sided adhesive tapes.

Further, the insulating member 41 disposed around the laminate X includes an opening portion 41c in which the laminate X is laminated (or guided), and the contact inner edge portion 41b contacted with the laminate X constitutes a peripheral portion of the opening portion 41c. The thickness of the contact inner edge portion 41b is larger (higher) than the total of the positive electrode layer 12 and the solid electrolyte layer 32, for example.

The positive electrode layer 12 and the negative electrode layer 22 are made of a powdery composite electrode material, and the solid electrolyte layer 32 is also made of a powder material. The composite electrode material is a mixture of an electrode active material and a solid electrolyte, but in some cases, the composite electrode material includes an electrode active material only. Accordingly, the laminate X will be referred to as "the powder layers" to emphasize that it is made of a powder material.

The shape and size of the all-solid-state secondary battery 1 will now be described. It appropriately has a square (circular or polygonal) shape in a plan view with the length of one side thereof ranging from 30 to 300 mm and a thickness thereof ranging from 50 to 500 μm. Accordingly, the laminate X has a square shape in a plan view, and the opening portion 41c for guiding the positive electrode layer 12 and the solid electrolyte layer 32 of the laminate X also has a square shape in a plan view.

In FIG. 1, the all-solid-state secondary battery rests on a horizontal plane, with its positive electrode side positioned low and its negative electrode side positioned high. Naturally, it is also possible that the negative electrode side is positioned low and the positive electrode side is positioned high.

The constituent materials of the main part of the all-solid-secondary battery will be described collectively after describing the production method.

The method of producing the all-solid-state secondary battery will be hereinafter described in detail with reference to FIGS. 2 to 8.

Figure 2:
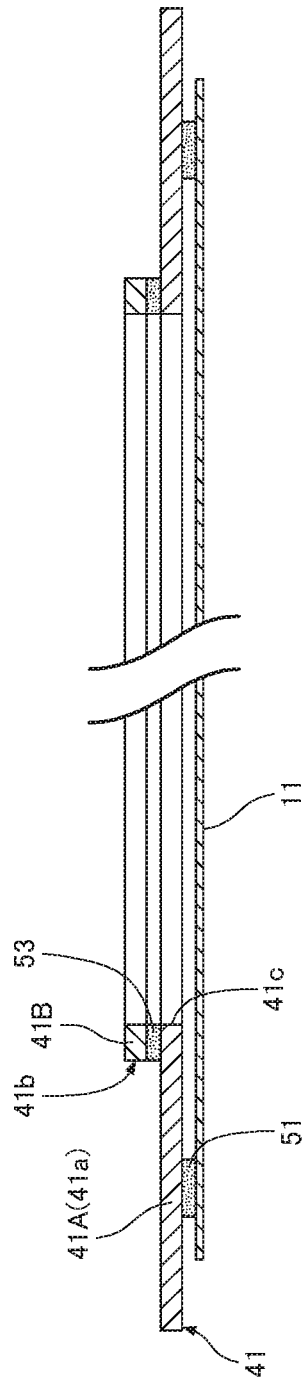
FIG. 2 is a sectional view for explaining a method of producing the all-solid-state secondary battery.

As shown in FIG. 2, the insulating member 41 is adhered onto the surface of the positive electrode collector 11 via the lower adhesive layer 51. The insulating member 41 has an opening portion 41c that can guide the positive electrode layer 12, and the contact inner edge portion 41b of the opening portion 41c has a larger thickness than the plate-shaped portion 41a on the outer side thereof.

It is herein supposed that the contact inner edge portion 41b having a larger thickness is formed by adhering a tape-shaped sub-insulating member 41B having a predetermined width onto the top surface of an inner peripheral portion of a plate-shaped main insulating member 41A via an adhesive layer 53.

Figure 3:
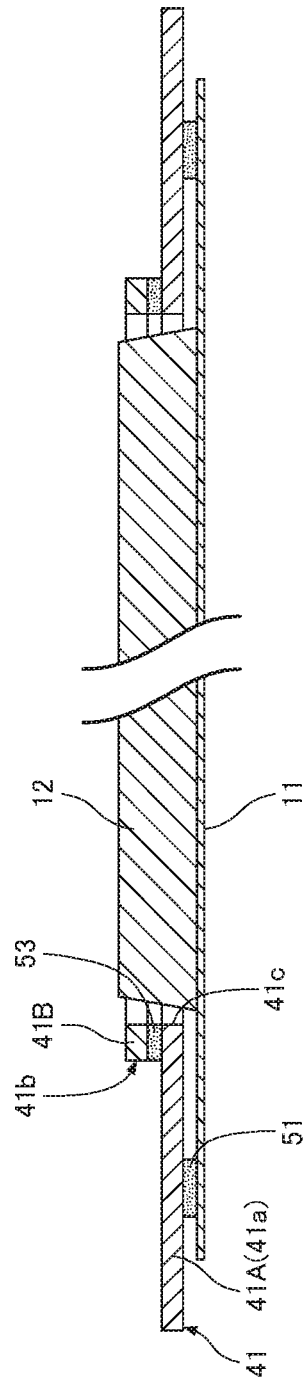
FIG. 3 is a sectional view for explaining a method of producing the all-solid-state secondary battery.

Next, as shown in FIG. 3, the positive electrode layer 12 is arranged on the surface of the positive electrode collector 11 within the opening portion 41c provided in the insulating member 41, or the main insulating member 41A.

Figure 4:
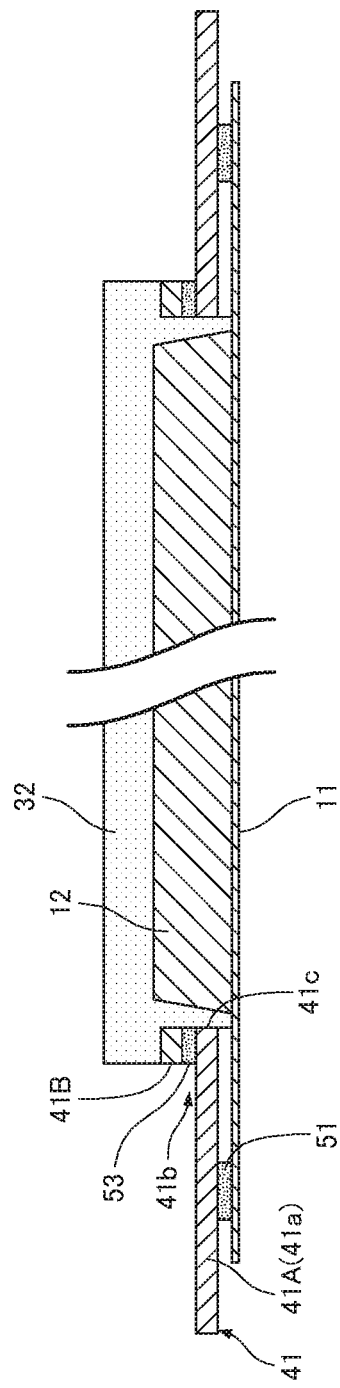
FIG. 4 is a sectional view for explaining a method of producing the all-solid-state secondary battery.

Next, as shown in FIG. 4, the solid electrolyte layer 32 having a predetermined thickness is provided on the top surface of the positive electrode layer 12. The outer peripheral portion of the solid electrolyte layer 32 is provided to cover the top surface of the tape-shaped sub-insulating member 41B having a width of 1 mm, for example.

Figure 5:
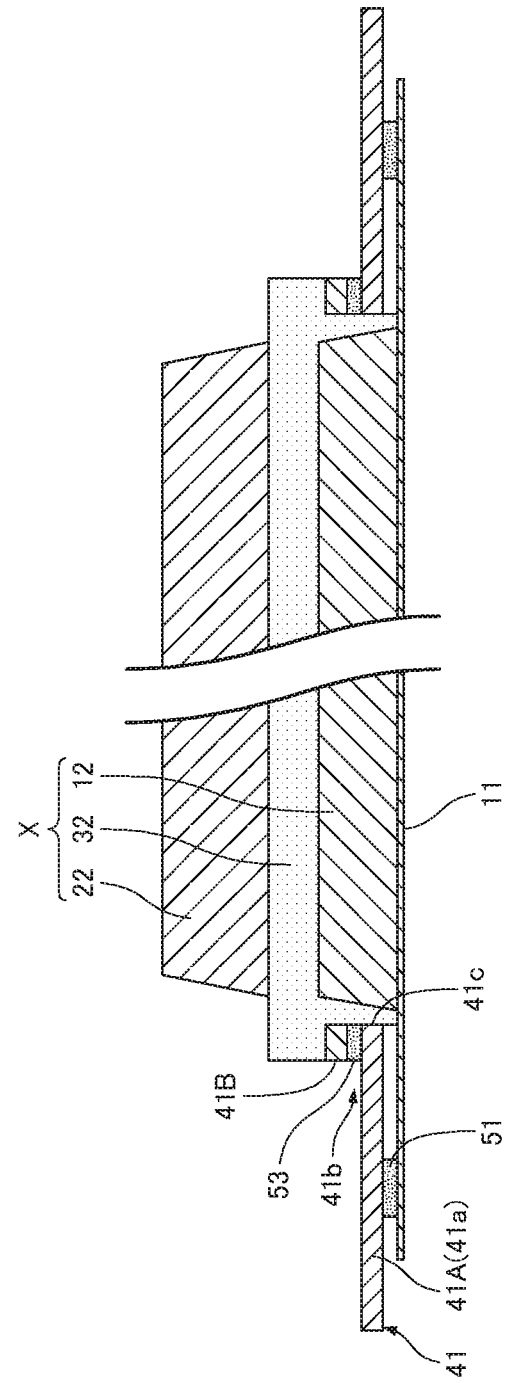
FIG. 5 is a sectional view for explaining a method of producing the all-solid-state secondary battery.

Next, as shown in FIG. 5, the negative electrode layer 22 having a predetermined thickness is provided on the top surface of the solid electrolyte layer 32 to complete the laminate X.

Figure 6:
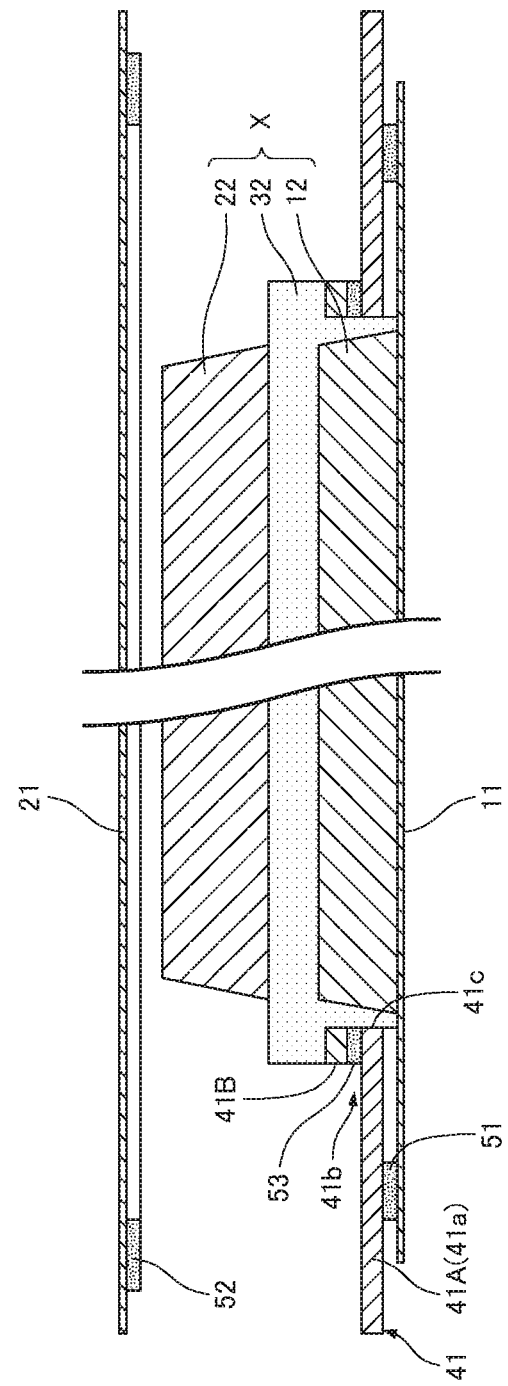
FIG. 6 is a sectional view for explaining a method of producing the all-solid-state secondary battery.
Figure 7:
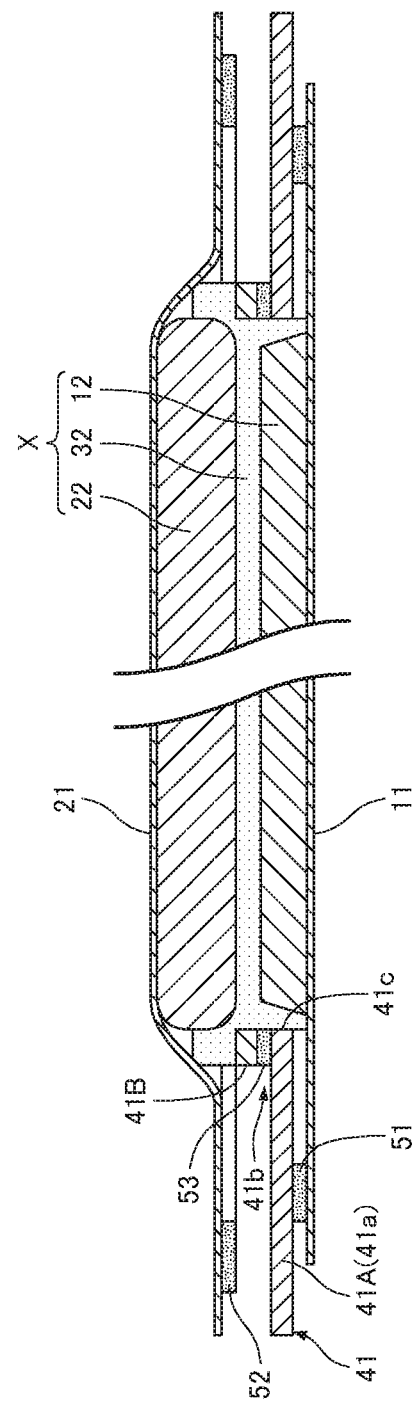
FIG. 7 is a sectional view for explaining a method of producing the all-solid-state secondary battery.

Next, as shown in FIGS. 6 and 7, a negative electrode collector 21 with an upper adhesive layer 52 attached on a periphery thereof is provided on the top surface of the negative electrode layer 22, and the work is subjected to temporary pressing with a low pressure of about 5,000 Pa while drawing the air away. The negative electrode collector 21 is adhered to the top surface of the insulating member 41 via the upper adhesive layer 52.

Figure 8:
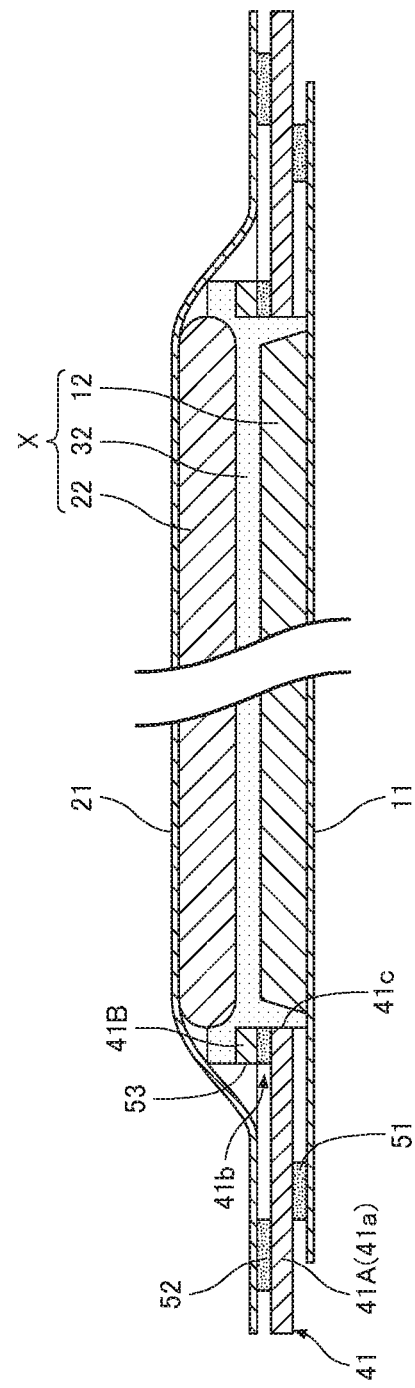
FIG. 8 is a sectional view for explaining a method of producing the all-solid-state secondary battery.

Next, as shown in FIG. 8, the work is subjected to full pressing with a high pressure of about 10 ton/cm$^2$, while drawing the inside air away.

When the negative electrode collector 21 is pressed from above, an elastic member such as a rubber plate is provided between the negative electrode collector 21 and a pressing member (not shown).

Finally, the battery including the laminate X between the collectors 11, 21 is sandwiched with a pair of stainless steel plates, and then sandwiched with laminated films having tab leads for extracting electricity, and the periphery of the laminated films is subjected to thermal fusion bonding under a vacuum for laminated packing.

Thus, a unitary all-solid-state secondary battery is obtained. Typically, an all-solid-state secondary battery includes a plurality of unitary batteries stacked in series or arranged in parallel.

When the work is subjected to full pressing, wrinkles of the collectors 11, 21 are produced in the peripheral portion of the powder layers due to the pressing force applied to the powder layers, and the wrinkles spread in the distortion absorbing regions L1, L2. Thus, it can be prevented that deformation such as wrinkles occurs in the portions on the powder layers, and therefore, it can be prevented that an internal short circuit occurs due to destruction of the layer structure in the peripheral portion of the powder layers.

The main part of the above production method can be described as including the following steps.

This method is a method of producing an all-solid-state secondary battery, the all-solid-state secondary battery including: a pair of collectors; a laminate; and a plate-shaped insulating member, the laminate and the insulating member being arranged between the pair of collectors, the laminate including a positive electrode layer, a solid electrolyte layer, and a negative electrode layer stacked together, the insulating member being arranged around the laminate and contacted at least with the solid electrolyte layer to electrically insulate the positive electrode layer and the negative electrode layer from each other, the method comprising the steps of: adhering, to a surface of one of the pair of collectors, the plate-shaped insulating member including an opening portion capable of guiding the positive electrode layer or the negative electrode layer and including an inner edge portion of the opening portion having a larger thickness than an outer side thereof; arranging the positive electrode layer or the negative electrode layer in the opening portion of the insulating member adhered in the previous step; arranging the solid electrolyte layer on a top surface of the positive electrode layer or the negative electrode layer arranged in the previous step; arranging the negative electrode layer or the positive electrode layer on a top surface of the solid electrolyte layer arranged in the previous step, and obtaining a laminate; and arranging the other of the pair of collectors on the laminate obtained in the previous step and then applying a pressure.

In the above embodiment, it was described that the contact inner edge portion of the insulating member contacted with the laminate has a larger thickness than the plate-shaped portion on the outer side. It is also possible to described that the contact inner edge portion of the insulating member contacted with the laminate has a larger thickness than the plate-shaped portion on the outer side, so as to provide a collapse preventing portion that can prevent the collapse of the peripheral portion of the laminate, and it is also possible to describe that the contact inner edge portion of the insulating member contacted with the laminate has a larger thickness than the plate-shaped portion on the outer side, so as to provide a shear collapse preventing portion that can prevent the shear collapse of the peripheral portion of the laminate when the battery is pressed.

The materials of the main components of the above all-solid-state secondary battery 1 will be hereinafter described.

The positive electrode collector 11 and the negative electrode collector 21 are constituted by a thin plate or a foil made of copper (Cu), magnesium (Mg), a stainless steel, titanium (Ti), iron (Fe), cobalt (Co), nickel (Ni), zinc (Zn), aluminum (Al), germanium (Ge), indium (In), lithium (Li), tin (Sn), or an alloy of these metals. The thin plate or the foil has a thickness of 5 μm to 100 μm. In the embodiment, the positive electrode collector 11 is constituted by an aluminum foil, and the negative electrode collector 21 is constituted by a copper foil. Further, the surfaces of the collectors 11, 21 are preferably subjected to a roughening treatment so as to improve tight attachment between the collectors 11, 21 and the laminate X made of the powder. The roughening treatment is to increase the surface roughness by etching, for example. In the embodiment, the positive electrode collector 11 is constituted by an aluminum foil subjected to an etching treatment (also referred to as an etched aluminum foil). The negative electrode collector 21 is constituted by a copper foil subjected to the etching treatment (also referred to as the roughened copper foil), but it is also possible that the negative electrode collector 21 is constituted by a copper foil not subjected to the etching treatment. Further, the insulating member 41 (41A, 41B) is constituted by an insulating sheet made of a polymer material such as a PET film.

With such collectors subjected to the etching treatment, the cavities produced by etching are collapsed by the pressing in producing the all-solid-state secondary battery, such that the cavities tend to bite the surfaces of the electrode layers, that is, the positive electrode layer 12 and the negative electrode layer 22. Accordingly, the collectors and the electrode layers tend to be integrated together.

The electrode layers are made of a mixture material including, at a predetermined ratio, an electrode active material that ensures an electron conduction path between particles for transferring electrons and a solid electrolyte having ion conductivity. Since the solid electrolyte having lithium ion conductivity is thus mixed in the electron active material and provides ion conductivity in addition to the electron conductivity, an ion conduction path can be ensured between particles.

The positive electrode active material suited for the positive electrode layer 12 is any material that allows insertion and separation of lithium ions. Examples of the positive electrode active material include a layered oxide such as lithium-nickel composite oxide ($LiNi_xM_{1-x}O_2$ where M is at least one of Co, Al, Mn, V, Cr, Mg, Ca, Ti, Zr, Nb, Mo, and W), lithium cobaltate (LiCoO$_2$), lithium nickelate (LiNiO$_2$), and lithium manganate (LiMn$_2$O$_4$), a solid solution such as lithium iron phosphate (LiFePO$_4$) having an olivine structure, lithium manganate (LiMn$_2$O$_4$, Li$_2$MnO$_3$, LiMO$_2$) having a spinel structure, or a mixture thereof, and sulfur (S) and a sulfide such as lithium sulfide (Li$_2$S). In the embodiment, the positive electrode active material is lithium-nickel-cobalt-aluminum composite oxide (LiNi$_{0.8}$Co$_{0.15}$Al$_{0.05}$O$_2$, hereinafter referred to as NCA-based composite oxide).

On the other hand, the negative electrode active material suited for the negative electrode layer 22 is a carbon material such as natural graphite, artificial graphite, graphite carbon fiber, resin calcined carbon, or an alloy-based material to be combined with the solid electrolyte. Examples of the alloy-based material include lithium alloys (LiAl, LiZn, Li$_3$Bi, Li$_3$Cd, Li$_3$Sb, Li$_4$Si, Li$_{4.4}$Pb, Li$_{4.4}$Sn, Li$_{0.17}$C, LiC$_6$, etc.), lithium titanate (Li$_4$Ti$_5$O$_{12}$), and metal oxides of Zn, etc. In the embodiment, the negative electrode active material is natural or artificial graphite.

Further, the positive electrode active material and the negative electrode active material may have coatings on the surfaces thereof, the coating being made of zirconia (ZrO$_2$), alumina (Al$_2$O$_3$), lithium titanate (Li$_4$Ti$_5$O$_{12}$), lithium niobate (Li$_4$NbO$_3$), carbon (C), etc.

The solid electrolytes can be roughly divided into organic polymer electrolytes (also referred to as organic solid electrolytes) and inorganic solid electrolytes, and both can be used as the solid electrolyte. The inorganic solid electrolytes can be roughly divided into oxide materials and sulfide materials, and both can be used. Further, the inorganic solid electrolyte can be appropriately selected from crystalline or amorphous ones. That is, the solid electrolyte can be appropriately selected from materials made of an organic compound, an inorganic compound, or a mixture thereof. More specifically, examples of the material that can be used as the solid electrolyte include lithium-containing metal oxides (containing one or more metals) such as Li$_2$—SiO$_2$ and Li$_2$—SiO$_2$—P$_2$O$_5$, lithium-containing metal nitride such as Li$_x$P$_y$O$_{1-z}$N$_z$, lithium-containing sulfide glasses such as those based on Li$_2$S—P$_2$S$_5$, Li$_2$S—SiS$_2$, Li$_2$S—B$_2$S$_3$, Li$_2$S—GeS$_2$, Li$_2$S—SiS$_2$—LiI, Li$_2$S—SiS$_2$—Li$_3$PO$_4$, Li$_2$S—Ge$_2$S$_2$, Li$_2$S—GeS$_2$—P$_2$S$_5$, and Li$_2$S—GeS$_2$—ZnS, and lithium-containing transition metal oxides such as PEO (polyethylene oxide), PVDF (polyvinylidene-fluoride), lithium phosphate (Li$_2$PO$_4$), and lithium-titanium oxide. In the embodiment, the solid electrolyte is a Li$_2$S—P$_2$S$_5$-based glass among the sulfide inorganic solid electrolytes based on sulfide glasses having a high ion conductivity. The solid electrolyte suited for the solid electrolyte layer 32 is either the same as or different from the solid electrolyte used in the positive electrode layer 12 and the negative electrode layer 22.

In the embodiment, the adhesive layers are constituted by pressure sensitive adhesives such as double-sided adhesive tapes for convenience of handling. It is also possible to use liquid or solid adhesives.

According to the above all-solid-state secondary battery and the method of producing the same, the contact inner edge portion 41b of the insulating member 41 contacted with the laminate X has a larger thickness than the plate-shaped portion 41a positioned on the outer side. Therefore, it is possible to prevent the collapse due to a shearing force occurring in the peripheral portion of the laminate X when the laminate X is pressed, and therefore it is possible to prevent the occurrence of an internal short circuit (electric short circuit). That is, the inner edge portion of the opening portion 41a of the insulating member 41 serves as a collapse preventing block that can prevent shear collapse occurring when the laminate X is pressed.

For example, when the positive electrode layer 12, the solid electrolyte layer 32, and the negative electrode layer 22 are simply stacked together, the middle portion is the thickest and the peripheral portion is thin. In this state, pressing with a high pressure does not cause a large force to be applied to the peripheral portion, and therefore, the powder materials are insufficiently fixed together in the peripheral portion, and the layer structure tends to be broken due to an impact or deformation of the collectors. Such a situation can be avoided.

The results obtained when the all-solid-state secondary battery actually produced is charged and discharged will be hereinafter described.

In this all-solid-state secondary battery, the positive electrode collector 11 was constituted by a roughened aluminum foil (etched aluminum) having a thickness of 20 μm, and the negative electrode collector 21 was constituted by a copper foil having a thickness of 18 μm. The insulating member 41 was constituted by a PET film (polyethylene terephthalate film) having a thickness of 50 μm. Each of the lower adhesive layer 51 and the upper adhesive layer 52 was constituted by a pressure sensitive adhesives film (double-sided adhesive tape) having a thickness of 30 μm and a width of 2 mm, and the adhesive layer 53 of the contact inner edge portion 41b was constituted by the same having a width of 1 mm.

Further, the positive electrode layer 12 was constituted by a mixture of the NCA-based composite oxide as the positive electrode active material and a glass ceramic composed of Li$_2$S (80 mol %)-P$_2$S$_5$ (20 mol %) as the solid electrolyte at a ratio of 7:3. The negative electrode layer 22 was constituted by a mixture of graphite powder as the negative electrode active material and a glass ceramic composed of Li$_2$S (80 mol %)-P$_2$S$_5$ (20 mol %) as the solid electrolyte at a ratio of 6:4. The solid electrolyte in the solid electrolyte layer 32 was constituted by a glass ceramic composed of Li$_2$S (80 mol %)-P$_2$S$_5$ (20 mol %).

The components were formed by, for example, electrostatic screen method to the respective predetermined thicknesses such that, after the full pressing, the positive electrode layer 12 has a thickness of about 70 μm, the negative electrode layer 22 has a thickness of about 130 μm, and the solid electrolyte layer 32 has a thickness of about 90 μm.

Finally, the obtained battery was sandwiched with a pair of stainless steel plates each having a square shape 70 mm on a side and having a thickness of 0.3 mm, and then sandwiched with laminated films having tab leads for extracting electricity, and the periphery of the laminated films was subjected to thermal fusion bonding under a vacuum to prepare the all-solid-state secondary battery 1.

Figure 9:
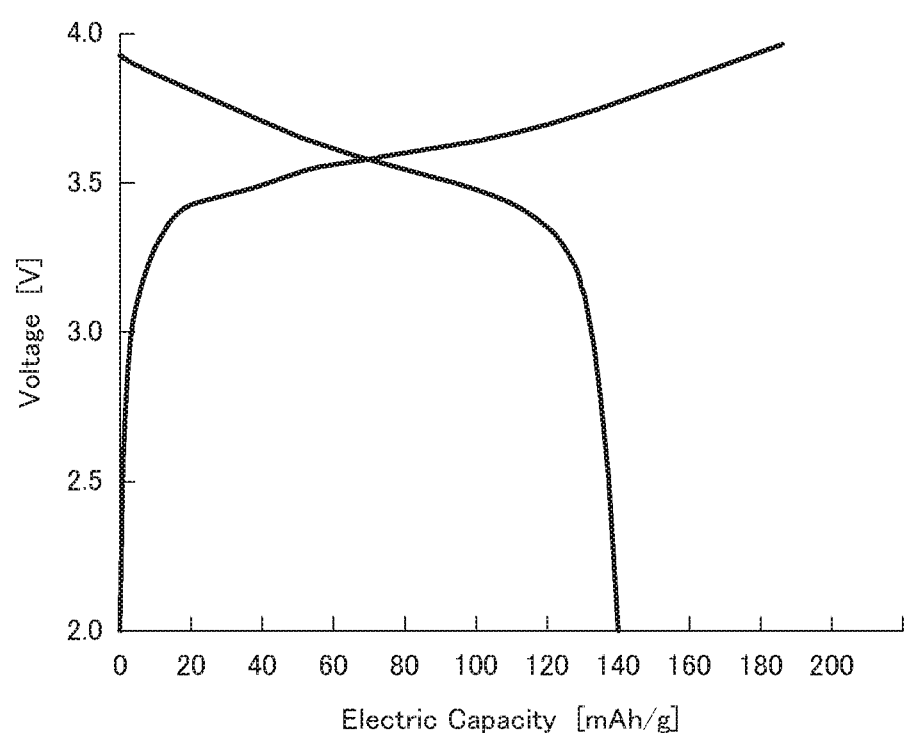
FIG. 9 is a graph showing charge-discharge curves of the all-solid-state secondary battery according to an example of the present invention.

For example, nine pieces of the all-solid-state secondary battery 1 were prepared, and all these batteries were successfully charged and discharged at 0.1 C and 4 to 2 V. Typical charge-discharge curves of these batteries are shown in FIG. 9. These charge-discharge curves show that this all-solid-state secondary battery operated normally. The pressing state of the all-solid-state secondary battery was checked with a pressure-sensitive paper, and it was found that the portion was pressed with a high pressure.

Five batteries not having the contact inner edge portion constituted by the insulating member were prepared as comparative examples. When these batteries were charged and discharged at 0.1 C and 4 to 2 V, internal short circuit occurred in four of the batteries. The other one battery, in which internal short circuit did not occur, was charged abnormally.

Figure 10:
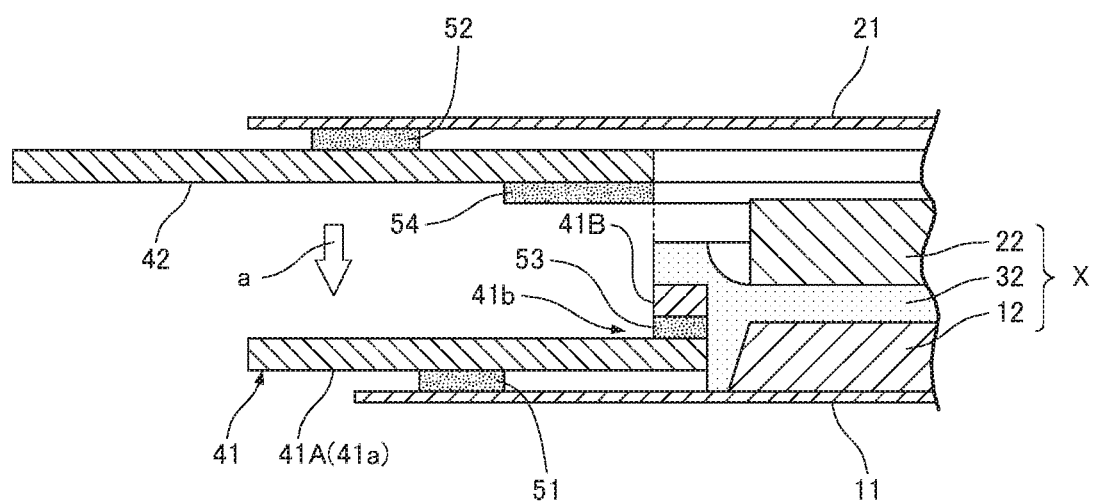
FIG. 10 is a sectional view of a main part of an all-solid-state secondary battery according to a variation of the present invention.

In the above embodiment, the contact inner edge portion of the opening portion of the insulating member arranged around the laminate has a larger thickness. As shown in FIG. 10 for example, it is also possible that an annular outer insulating member 42 that can be arranged along the outer side of the tape-shaped sub-insulating member 41B is adhered to the negative electrode collector 21 side shown in FIG. 7 via the upper adhesive layer 52, and when the battery is pressed (as shown by the arrow a), the outer insulating member 42 is adhered to the top surface of the plate-shaped portion 41A (41a) of the insulating member 41 via an adhesive layer 54. In another words, the total thickness of the insulating member 41 is enlarged to be above the lower surface of the solid electrolyte layer 32 of the laminate X after pressing.

What is claimed is:

1. An all-solid-state secondary battery comprising:
   a pair of collectors;
   a laminate; and
   a plate-shaped insulating member, the laminate and the insulating member being arranged between the pair of collectors, the laminate including a positive electrode layer, a solid electrolyte layer, and a negative electrode layer stacked together, the insulating member being arranged around the laminate and contacted at least with the solid electrolyte layer to electrically insulate the positive electrode layer and the negative electrode layer from each other,
   wherein in the insulating member, a contact inner edge portion contacted with the laminate has a larger thickness than a plate-shaped portion positioned on an outer side, and
   wherein the insulating member is arranged between the pair of collectors via a positive electrode-side adhesive layer and a negative electrode-side adhesive layer, and the adhesive layers are arranged distant from an inner end of the insulating member to provide a distortion absorbing region to each of the collectors.

* * * * *